US012699198B2

(12) United States Patent
Li et al.

(10) Patent No.: US 12,699,198 B2
(45) Date of Patent: Aug. 4, 2026

(54) INTERPRETING SEISMIC FAULTS WITH MACHINE LEARNING TECHNIQUES

(71) Applicant: Schlumberger Technology Corporation, Sugar Land, TX (US)

(72) Inventors: Cen Li, Houston, TX (US); Aria Abubakar, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 999 days.

(21) Appl. No.: 17/595,564

(22) PCT Filed: May 28, 2020

(86) PCT No.: PCT/US2020/034779
§ 371 (c)(1),
(2) Date: Nov. 19, 2021

(87) PCT Pub. No.: WO2020/243216
PCT Pub. Date: Dec. 3, 2020

(65) Prior Publication Data
US 2022/0229199 A1 Jul. 21, 2022

Related U.S. Application Data

(60) Provisional application No. 62/853,681, filed on May 28, 2019.

(51) Int. Cl.
*G06N 3/08* (2023.01)
*G01V 1/28* (2006.01)
(Continued)

(52) U.S. Cl.
CPC .............. *G01V 1/345* (2013.01); *G01V 1/282* (2013.01); *G06N 3/045* (2023.01); *G06N 3/08* (2013.01)

(58) Field of Classification Search
CPC ..... G06N 3/08; G06N 20/00; G06V 2210/642
See application file for complete search history.

(56) References Cited

U.S. PATENT DOCUMENTS

| | | | | |
|---|---|---|---|---|
| 5,987,388 | A | * | 11/1999 | Crawford ................. G01V 1/30 367/70 |
| 9,377,546 | B2 | * | 6/2016 | Vallikkat Thachaparambil .......... G01V 1/282 |

(Continued)

FOREIGN PATENT DOCUMENTS

| | | |
|---|---|---|
| CN | 109709603 A | 5/2019 |
| CN | 109799533 A | 5/2019 |

(Continued)

OTHER PUBLICATIONS

Hajeri, et al., "Wellbore Stability Management to Avoid Serious Drilling Hazards in High Deviated Well-Application of Real Time Geomechanics," Abu Dhabi International Petroleum Exhibition & Conference. (Year: 2017).*

(Continued)

*Primary Examiner* — Ryan F Pitaro
*Assistant Examiner* — Joseph P Morris
(74) *Attorney, Agent, or Firm* — Kyle R. Miiller

(57) ABSTRACT

A method for interpreting seismic data includes receiving seismic data that represents a subterranean volume, and generating inline probability values and crossline probability values using a first machine learning technique. The first machine learning technique is trained to identify one or more vertical fault lines in a seismic volume based on the seismic data. The method includes generating a merged data set by combining the inline probability values and the crossline probability values, training a second machine learning technique based on a subset of labeled horizontal planes from the merged data set, the second machine learning technique trained to identify horizontal fault lines from (Continued)

the seismic volume, and generating a representation of the seismic volume based on the second machine learning technique, the representation including an indication of a three-dimensional fault structure within the seismic volume.

17 Claims, 10 Drawing Sheets

(51) Int. Cl.
G01V 1/34 (2006.01)
G06N 3/045 (2023.01)

(56) References Cited

U.S. PATENT DOCUMENTS

| | | | |
|---|---|---|---|
| 10,139,508 B1 | 11/2018 | Lemus et al. | |
| 11,280,922 B2 * | 3/2022 | Benabbou | G01V 20/00 |
| 11,466,554 B2 * | 10/2022 | Karimi Vajargah | E21B 44/00 |
| 2005/0171700 A1 * | 8/2005 | Dean | G01V 1/301 |
| | | | 702/16 |
| 2012/0072116 A1 | 3/2012 | Dorn et al. | |
| 2014/0278115 A1 | 9/2014 | Bas et al. | |
| 2019/0041534 A1 | 2/2019 | Bandura | |

FOREIGN PATENT DOCUMENTS

| | | | | |
|---|---|---|---|---|
| CN | 109804274 A | 5/2019 | | |
| WO | WO-2018148492 A1 * | 8/2018 | | G06N 20/00 |
| WO | WO-2019035858 A1 * | 2/2019 | | G01V 1/345 |

OTHER PUBLICATIONS

Fernández-Ibáñez, et al., "3D Geomechanical Modeling for the Apiay and Suria Oil Fields (Llanos Orientales Basin, Colombia): Insights on the Stability of ReservoirBounding Faults," SPE Latin American & Caribbean Petroleum Engineering Conference. (Year: 2010).*

Wu, et al., "Automatic fault interpretation with optimal surface voting," Geophysics, vol. 83, No. 5. (Year: 2018).*

Guo, et al., "A new method for automatic seismic fault detection using convolutional neural network," SEG International Exposition and 88th Annual Meeting. (Year: 2018).*

Wu, "FaultSeg3D: Using synthetic data sets to train an end-to-end convolutional neural network for 3D seismic fault segmentation," Geophysics, vol. 84, No. 3. (Year: 2019).*

Guitton et al Statistical Identification of Faults in 3D Seismic Volumes Using a Machine Learning Approach. Aug. 17, 2017. Geophysics and Computer Science Departments, Colorado School of Mines, pp. 1-14. Abstract, pp. 1-11, and figures 2, 3, 11 (14 Pages).

International Search Report and Written Opinion of International Patent Application No. PCT/US2020/034779 issued (12 pages).

International Preliminary Report on Patentability of International Patent Application No. PCT/US2020/034779 dated Dec. 9, 2021, 9 pages.

Extended Search Report issued in European Patent Application No. 20813358.7 dated Jun. 21, 2024, 8 pages.

Tingdahl, K. M. et al., "Semi-automatic detection of faults in 3D seismic data", Geophysical Prospecting, 2005, 43, pp. 533-542.

Di, H. et al., "Seismic fault detection based on multi-attribute support vector machine analysis", SEG Expanded Abstracts, 2017, pp. 2039-2044.

Qi, J. et al., "Image processing of seismic attributes for automatic fault extraction", SEG Technical Program Expanded Abstracts, 2018, pp. 1644-1648.

First Office Action issued in Chinese Patent Application No. 202080052050.8 dated Nov. 1, 2024, 12 pages.

* cited by examiner

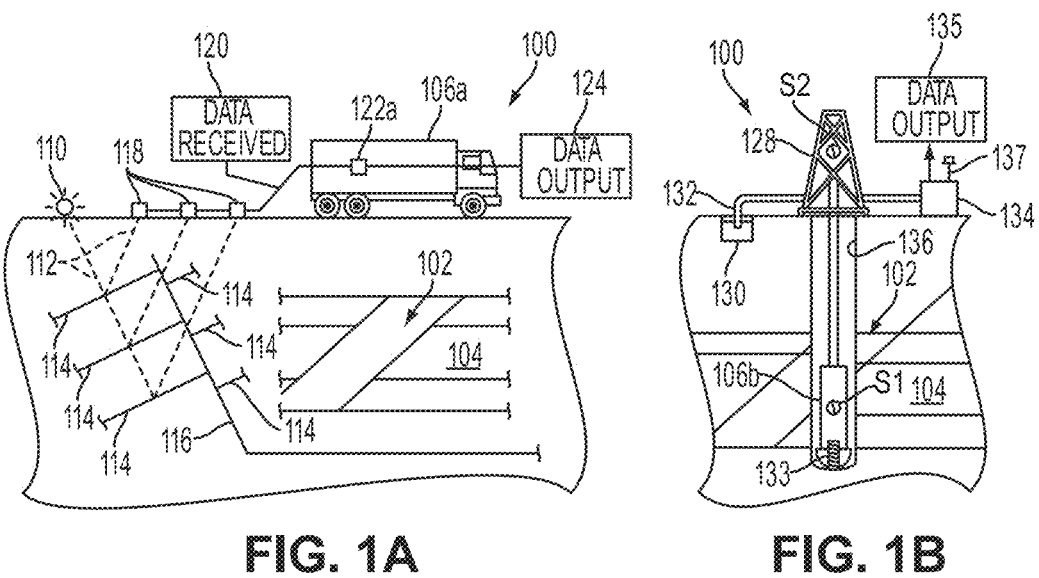
FIG. 1A            FIG. 1B
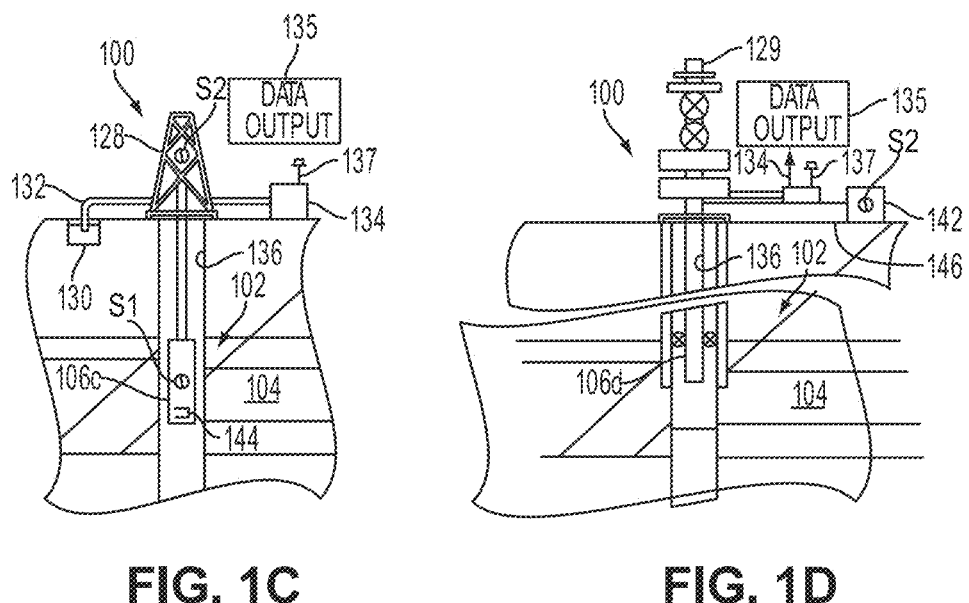
FIG. 1C            FIG. 1D

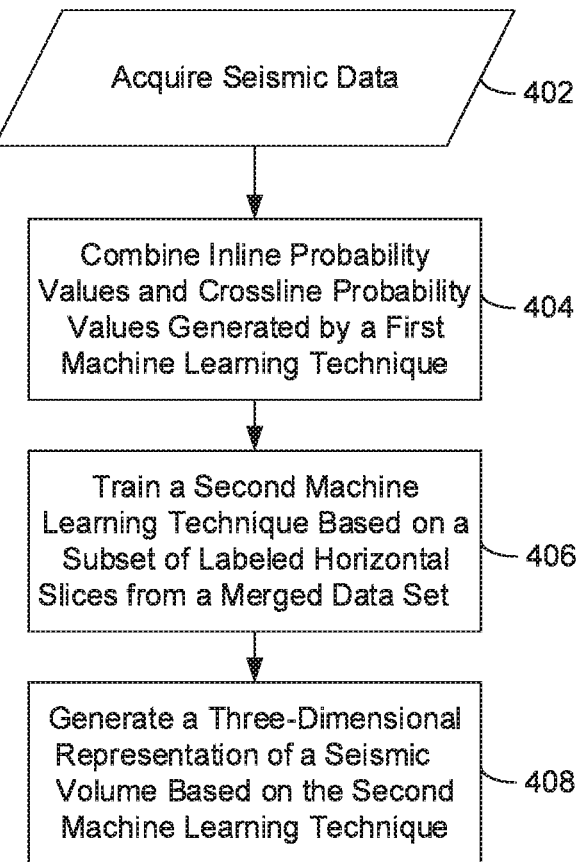

Acquire Seismic Data ~ 402

Combine Inline Probability Values and Crossline Probability Values Generated by a First Machine Learning Technique ~ 404

Train a Second Machine Learning Technique Based on a Subset of Labeled Horizontal Slices from a Merged Data Set ~ 406

Generate a Three-Dimensional Representation of a Seismic Volume Based on the Second Machine Learning Technique ~ 408

400
FIG 4

INTERPRETING SEISMIC FAULTS WITH MACHINE LEARNING TECHNIQUES

CROSS-REFERENCE TO RELATED APPLICATIONS

This application is a National Stage Entry of International Patent Application No. PCT/US2020/034779, filed May 28, 2020, which claims priority to U.S. Provisional Patent Application No. 62/853,681, which was filed on May 28, 2019, and is incorporated herein by reference in its entirety.

BACKGROUND

Interpretation of geological structures within seismic datasets can enable the exploration, development, and production of resources such as petroleum, among others. In some examples, interpreting the seismic datasets can include interpreting or identifying fault structures in geological formations. Due to the geological complexities in subsurface regions and limitations associated with seismic imaging resolution, interpretation of seismic datasets can be inefficient, inaccurate, and require performing a large number of repetitive tasks. For example, manually interpreting seismic data can be impractical because manually interpreting seismic data is labor intensive and time consuming, particularly with ever increasing quantities of costly seismic datasets.

In some examples, machine learning techniques can be used to automate fault interpretation from seismic data. The machine learning techniques can detect faults along vertical seismic sections such as inline seismic sections or crossline seismic sections. In some embodiments, labeled seismic data can be detected as user input. The labeled seismic data can train a machine learning technique, such as a deep neural network, among others. The trained machine learning technique can be used to detect faults on a given two-dimensional (2D) seismic image corresponding to inline seismic data or crossline seismic data. In some embodiments, the machine learning technique can then detect predicted faults for subsequent seismic data or 2D seismic images. In some examples, the machine learning techniques can aggregate predicted faults from the 2D seismic images to form predicted faults within a three-dimensional (3D) seismic volume. However, when using 3D seismic images versus 2D seismic images, the results include a high number of false positive noise and often lack coherence in 3D. For example, machine learning techniques can generate a high number of false positive values when the seismic data is noisy.

SUMMARY

Embodiments of the disclosure provide a method for interpreting seismic data. The method includes receiving seismic data that represents a subterranean volume, and generating one or more inline probability values and one or more crossline probability values using a first machine learning technique. The first machine learning technique is trained to identify one or more vertical fault lines in a seismic volume based on the seismic data. The method also includes generating a merged data set by combining the one or more inline probability values and the one or more crossline probability values, training a second machine learning technique based on a subset of labeled horizontal planes from the merged data set, the second machine learning technique trained to identify one or more horizontal fault lines from the seismic volume, and generating a representation of the seismic volume based on the second machine learning technique, the representation including an indication of a three-dimensional fault structure within the seismic volume.

Embodiments of the disclosure also provide a computing system for interpreting seismic data. The computing system includes one or more processors, and a memory system including one or more non-transitory computer-readable media storing instructions that, when executed by at least one of the one or more processors, cause the computing system to perform operations. The operations include receiving seismic data that represents a subterranean volume, and generating one or more inline probability values and one or more crossline probability values using a first machine learning technique. The first machine learning technique is trained to identify one or more vertical fault lines in a seismic volume based on the seismic data. The operations also include generating a merged data set by combining the one or more inline probability values and the one or more crossline probability values, training a second machine learning technique based on a subset of labeled horizontal planes from the merged data set, the second machine learning technique trained to identify one or more horizontal fault lines from the seismic volume, and generating a representation of the seismic volume based on the second machine learning technique, the representation including an indication of a three-dimensional fault structure within the seismic volume.

Embodiments of the disclosure further provide at least one non-transitory computer-readable medium for interpreting seismic data, the at least one computer-readable medium comprising a plurality of computer-executable instructions that, in response to execution by a processor, cause the processor to receive seismic data that represents a subterranean volume, and generate one or more inline probability values and one or more crossline probability values using a first machine learning technique. The first machine learning technique is trained to identify one or more vertical fault lines in a seismic volume based on the seismic data. The instructions further cause the processor to generate a merged data set by combining the one or more inline probability values and the one or more crossline probability values, train a second machine learning technique based on a subset of labeled horizontal planes from the merged data set, the second machine learning technique trained to identify one or more horizontal fault lines from the seismic volume, and generate a representation of the seismic volume based on the second machine learning technique, the representation including an indication of a three-dimensional fault structure within the seismic volume.

Thus, the computing systems and methods disclosed herein are more effective methods for processing collected data that may, for example, correspond to a surface and a subsurface region. These computing systems and methods increase data processing effectiveness, efficiency, and accuracy. Such methods and computing systems may complement or replace conventional methods for processing collected data. This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures:

FIGS. 1A, 1B, 1C, 1D, 2, 3A, and 3B illustrate simplified, schematic views of an oilfield and its operation, according to an embodiment.

FIG. 4 illustrates a process flow diagram of a method for interpreting seismic data, according to an embodiment.

DESCRIPTION OF EMBODIMENTS

Figure 2:
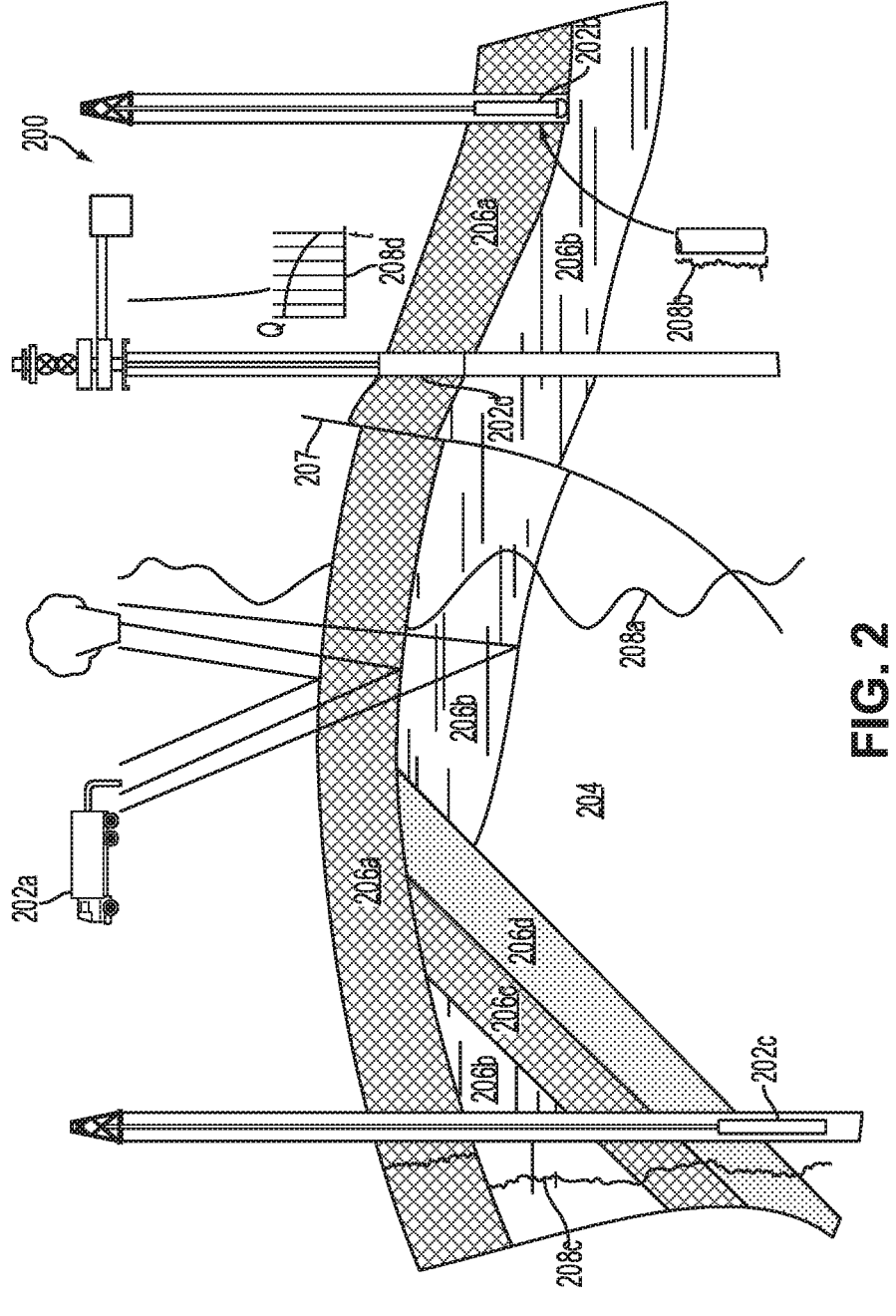

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object could be termed a second object, and, similarly, a second object could be termed a first object, without departing from the scope of the invention. The first object and the second object are both objects, respectively, but they are not to be considered the same object.

The terminology used in the description of the invention herein is for the purpose of describing particular embodiments only and is not intended to be limiting of the invention. As used in the description of the invention and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Attention is now directed to processing procedures, methods, techniques and workflows that are in accordance with some embodiments. Some operations in the processing procedures, methods, techniques and workflows disclosed herein may be combined and/or the order of some operations may be changed.

FIGS. 1A-1D illustrate simplified, schematic views of oilfield 100 having subterranean formation 102 containing reservoir 104 therein in accordance with implementations of various technologies and techniques described herein. FIG. 1A illustrates a survey operation being performed by a survey tool, such as seismic truck 106a, to measure properties of the subterranean formation. The survey operation is a seismic survey operation for producing sound vibrations. In FIG. 1A, one such sound vibration, e.g., sound vibration 112 generated by source 110, reflects off horizons 114 in earth formation 116. A set of sound vibrations is received by sensors, such as geophone-receivers 118, situated on the earth's surface. The data received 120 is provided as input data to a computer 122a of a seismic truck 106a, and responsive to the input data, computer 122a generates seismic data output 124. This seismic data output may be stored, transmitted or further processed as desired, for example, by data reduction.

FIG. 1B illustrates a drilling operation being performed by drilling tools 106b suspended by rig 128 and advanced into subterranean formations 102 to form wellbore 136. Mud pit 130 is used to draw drilling mud into the drilling tools via flow line 132 for circulating drilling mud down through the drilling tools, then up wellbore 136 and back to the surface. The drilling mud is typically filtered and returned to the mud pit. A circulating system may be used for storing, controlling, or filtering the flowing drilling mud. The drilling tools are advanced into subterranean formations 102 to reach reservoir 104. Each well may target one or more reservoirs. The drilling tools are adapted for measuring downhole properties using logging while drilling tools. The logging while drilling tools may also be adapted for taking core sample 133 as shown.

Computer facilities may be positioned at various locations about the oilfield 100 (e.g., the surface unit 134) and/or at remote locations. Surface unit 134 may be used to communicate with the drilling tools and/or offsite operations, as well as with other surface or downhole sensors. Surface unit 134 is capable of communicating with the drilling tools to send commands to the drilling tools, and to receive data therefrom. Surface unit 134 may also collect data generated during the drilling operation and produce data output 135, which may then be stored or transmitted.

Sensors(S), such as gauges, may be positioned about oilfield 100 to collect data relating to various oilfield operations as described previously. As shown, sensors S1, S2 are positioned in one or more locations in the drilling tools and/or at rig 128 to measure drilling parameters, such as weight on bit, torque on bit, pressures, temperatures, flow rates, compositions, rotary speed, and/or other parameters of the field operation. Sensors(S) may also be positioned in one or more locations in the circulating system.

Drilling tools 106b may include a bottom hole assembly (BHA) (not shown), generally referenced, near the drill bit (e.g., within several drill collar lengths from the drill bit). The bottom hole assembly includes capabilities for measuring, processing, and storing information, as well as communicating with surface unit 134. The bottom hole assembly further includes drill collars for performing various other measurement functions.

The bottom hole assembly may include a communication subassembly that communicates with surface unit 134. The communication subassembly is adapted to send signals to and receive signals from the surface using a communications channel such as mud pulse telemetry, electro-magnetic telemetry, or wired drill pipe communications. The communication subassembly may include, for example, a transmitter that generates a signal, such as an acoustic or electromagnetic signal, which is representative of the measured drilling parameters. It will be appreciated by one of skill in the art that a variety of telemetry systems may be employed, such as wired drill pipe, electromagnetic or other known telemetry systems.

Typically, the wellbore is drilled according to a drilling plan that is established prior to drilling. The drilling plan typically sets forth equipment, pressures, trajectories and/or other parameters that define the drilling process for the wellsite. The drilling operation may then be performed according to the drilling plan. However, as information is gathered, the drilling operation may need to deviate from the drilling plan. Additionally, as drilling or other operations are performed, the subsurface conditions may change. The earth model may also need adjustment as new information is collected.

The data gathered by sensors (S) may be collected by surface unit 134 and/or other data collection sources for analysis or other processing. The data collected by sensors (S) may be used alone or in combination with other data. The data may be collected in one or more databases and/or transmitted on or offsite. The data may be historical data, real time data, or combinations thereof. The real time data may be used in real time, or stored for later use. The data may also be combined with historical data or other inputs for further analysis. The data may be stored in separate databases, or combined into a single database.

Surface unit 134 may include transceiver 137 to allow communications between surface unit 134 and various portions of the oilfield 100 or other locations. Surface unit 134 may also be provided with or functionally connected to one or more controllers (not shown) for actuating mechanisms at oilfield 100. Surface unit 134 may then send command signals to oilfield 100 in response to data received. Surface unit 134 may receive commands via transceiver 137 or may itself execute commands to the controller. A processor may be provided to analyze the data (locally or remotely), make the decisions and/or actuate the controller. In this manner, oilfield 100 may be selectively adjusted based on the data collected. This technique may be used to optimize (or improve) portions of the field operation, such as controlling drilling, weight on bit, pump rates, or other parameters. These adjustments may be made automatically based on computer protocol, and/or manually by an operator. In some cases, well plans may be adjusted to select optimum (or improved) operating conditions, or to avoid problems.

FIG. 1C illustrates a wireline operation being performed by wireline tool 106c suspended by rig 128 and into wellbore 136 of FIG. 1B. Wireline tool 106c is adapted for deployment into wellbore 136 for generating well logs, performing downhole tests and/or collecting samples. Wireline tool 106c may be used to provide another method and apparatus for performing a seismic survey operation. Wireline tool 106c may, for example, have an explosive, radioactive, electrical, or acoustic energy source 144 that sends and/or receives electrical signals to surrounding subterranean formations 102 and fluids therein.

Wireline tool 106c may be operatively connected to, for example, geophones 118 and a computer 122a of a seismic truck 106a of FIG. 1A. Wireline tool 106c may also provide data to surface unit 134. Surface unit 134 may collect data generated during the wireline operation and may produce data output 135 that may be stored or transmitted. Wireline tool 106c may be positioned at various depths in the wellbore 136 to provide a survey or other information relating to the subterranean formation 102.

Sensors(S), such as gauges, may be positioned about oilfield 100 to collect data relating to various field operations as described previously. As shown, a sensor S1 is positioned in wireline tool 106c to measure downhole parameters which relate to, for example porosity, permeability, fluid composition and/or other parameters of the field operation.

FIG. 1D illustrates a production operation being performed by production tool 106d deployed from a production unit or Christmas tree 129 and into completed wellbore 136 for drawing fluid from the downhole reservoirs into surface facilities 142. The fluid flows from reservoir 104 through perforations in the casing (not shown) and into production tool 106d in wellbore 136 and to surface facilities 142 via gathering network 146.

Sensors(S), such as gauges, may be positioned about oilfield 100 to collect data relating to various field operations as described previously. As shown, a sensor S2 may be positioned in production tool 106d or associated equipment, such as Christmas tree 129, gathering network 146, surface facility 142, and/or the production facility, to measure fluid parameters, such as fluid composition, flow rates, pressures, temperatures, and/or other parameters of the production operation.

Production may also include injection wells for added recovery. One or more gathering facilities may be operatively connected to one or more of the wellsites for selectively collecting downhole fluids from the wellsite(s).

While FIGS. 1B-1D illustrate tools used to measure properties of an oilfield, it will be appreciated that the tools may be used in connection with non-oilfield operations, such as gas fields, mines, aquifers, storage or other subterranean facilities. Also, while certain data acquisition tools are depicted, it will be appreciated that various measurement tools capable of sensing parameters, such as seismic two-way travel time, density, resistivity, production rate, etc., of the subterranean formation and/or its geological formations may be used. Various sensors (S) may be located at various positions along the wellbore and/or the monitoring tools to collect and/or monitor the desired data. Other sources of data may also be provided from offsite locations.

The field configurations of FIGS. 1A-1D are intended to provide a brief description of an example of a field usable with oilfield application frameworks. Part of, or the entirety, of oilfield 100 may be on land, water and/or sea. Also, while a single field measured at a single location is depicted, oilfield applications may be utilized with any combination of one or more oilfields, one or more processing facilities and one or more well sites.

FIG. 2 illustrates a schematic view, partially in cross section of oilfield 200 having data acquisition tools 202a, 202b, 202c and 202d positioned at various locations along oilfield 200 for collecting data of subterranean formation 204 in accordance with implementations of various technologies and techniques described herein. Data acquisition tools 202a-202d may be the same as data acquisition tools 106a-106d of FIGS. 1A-1D, respectively, or others not depicted. As shown, data acquisition tools 202a-202d generate data plots or measurements 208a-208d, respectively. These data plots are depicted along oilfield 200 to demonstrate the data generated by the various operations.

Data plots 208a-208c are examples of static data plots that may be generated by data acquisition tools 202a-202c, respectively; however, it should be understood that data plots 208a-208c may also be data plots that are updated in real time. These measurements may be analyzed to better define the properties of the formation(s) and/or determine the accuracy of the measurements and/or for checking for errors. The plots of each of the respective measurements may be aligned and scaled for comparison and verification of the properties.

Static data plot 208a is a seismic two-way response over a period of time. Static plot 208c is core sample data measured from a core sample of the formation 204. The core sample may be used to provide data, such as a graph of the density, porosity, permeability, or some other physical property of the core sample over the length of the core. Tests for density and viscosity may be performed on the fluids in the core at varying pressures and temperatures. Static data plot 208c is a logging trace that typically provides a resistivity or other measurement of the formation at various depths.

A production decline curve or graph 208d is a dynamic data plot of the fluid flow rate over time. The production decline curve typically provides the production rate as a function of time. As the fluid flows through the wellbore, measurements are taken of fluid properties, such as flow rates, pressures, composition, etc.

Other data may also be collected, such as historical data, user inputs, economic information, and/or other measurement data and other parameters of interest. As described below, the static and dynamic measurements may be analyzed and used to generate models of the subterranean formation to determine characteristics thereof. Similar measurements may also be used to measure changes in formation aspects over time.

The subterranean structure 204 has a plurality of geological formations 206a-206d. As shown, this structure has several formations or layers, including a shale layer 206a, a carbonate layer 206b, a shale layer 206c and a sand layer 206d. A fault 207 extends through the shale layer 206a and the carbonate layer 206b. The static data acquisition tools are adapted to take measurements and detect characteristics of the formations.

While a specific subterranean formation with specific geological structures is depicted, it will be appreciated that oilfield 200 may contain a variety of geological structures and/or formations, sometimes having extreme complexity. In some locations, typically below the water line, fluid may occupy pore spaces of the formations. Each of the measurement devices may be used to measure properties of the formations and/or its geological features. While each acquisition tool is shown as being in specific locations in oilfield 200, it will be appreciated that one or more types of measurement may be taken at one or more locations across one or more fields or other locations for comparison and/or analysis.

The data collected from various sources, such as the data acquisition tools of FIG. 2, may then be processed and/or evaluated. Typically, seismic data displayed in static data plot 208a from data acquisition tool 202a is used by a geophysicist to determine characteristics of the subterranean formations and features. The core data shown in static plot 208b and/or log data from well log 208c are typically used by a geologist to determine various characteristics of the subterranean formation. The production data from graph 208d is typically used by the reservoir engineer to determine fluid flow reservoir characteristics. The data analyzed by the geologist, geophysicist and the reservoir engineer may be analyzed using modeling techniques.

Figure 3A:
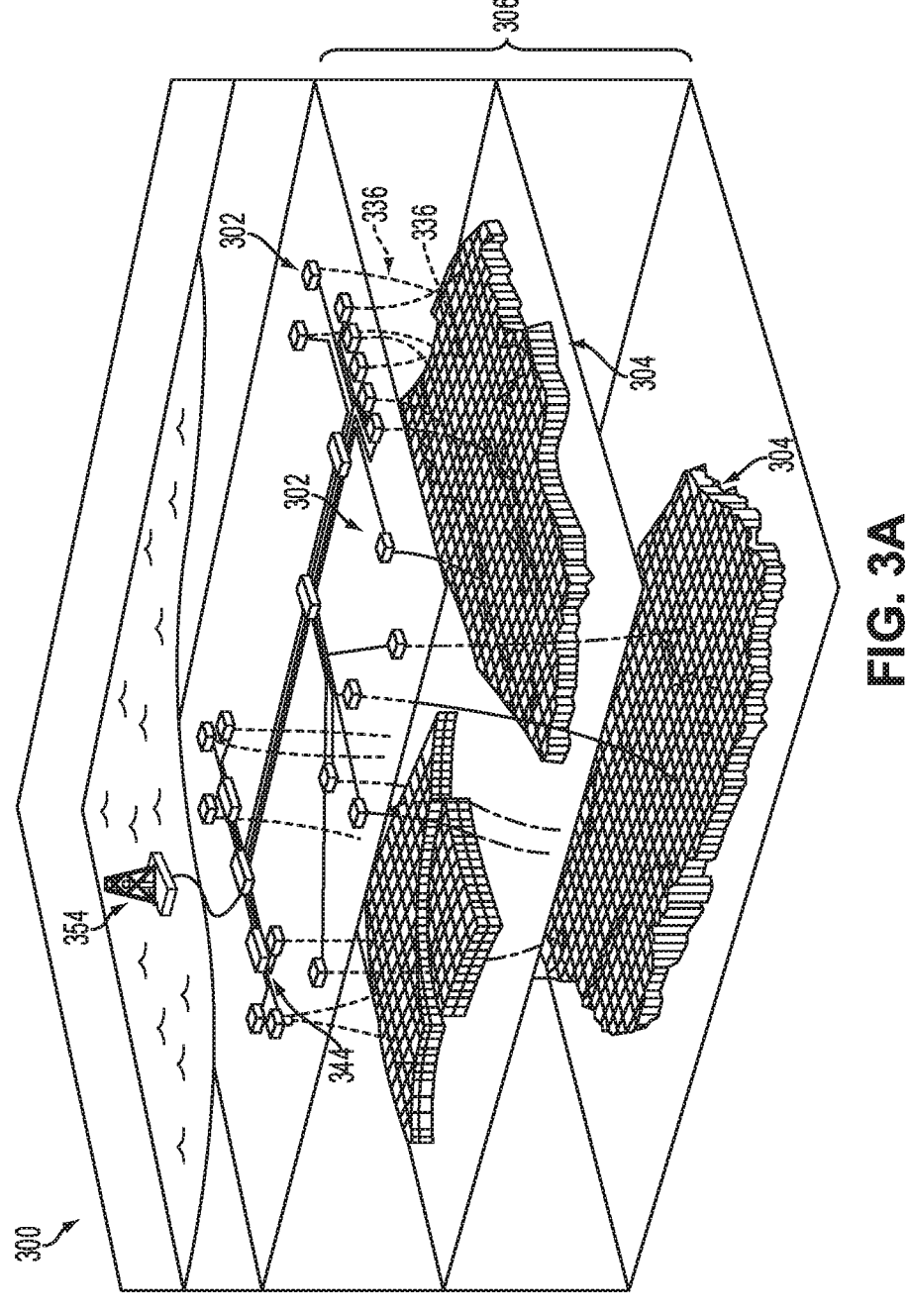

FIG. 3A illustrates an oilfield 300 for performing production operations in accordance with implementations of various technologies and techniques described herein. As shown, the oilfield has a plurality of wellsites 302 operatively connected to central processing facility 354. The oilfield configuration of FIG. 3A is not intended to limit the scope of the oilfield application system. Part, or all, of the oilfield may be on land and/or sea. Also, while a single oilfield with a single processing facility and a plurality of wellsites is depicted, any combination of one or more oilfields, one or more processing facilities and one or more wellsites may be present.

Each wellsite 302 has equipment that forms wellbore 336 into the earth. The wellbores extend through subterranean formations 306 including reservoirs 304. These reservoirs 304 contain fluids, such as hydrocarbons. The wellsites draw fluid from the reservoirs and pass them to the processing facilities via surface networks 344. The surface networks 344 have tubing and control mechanisms for controlling the flow of fluids from the wellsite to processing facility 354.

Figure 3B:
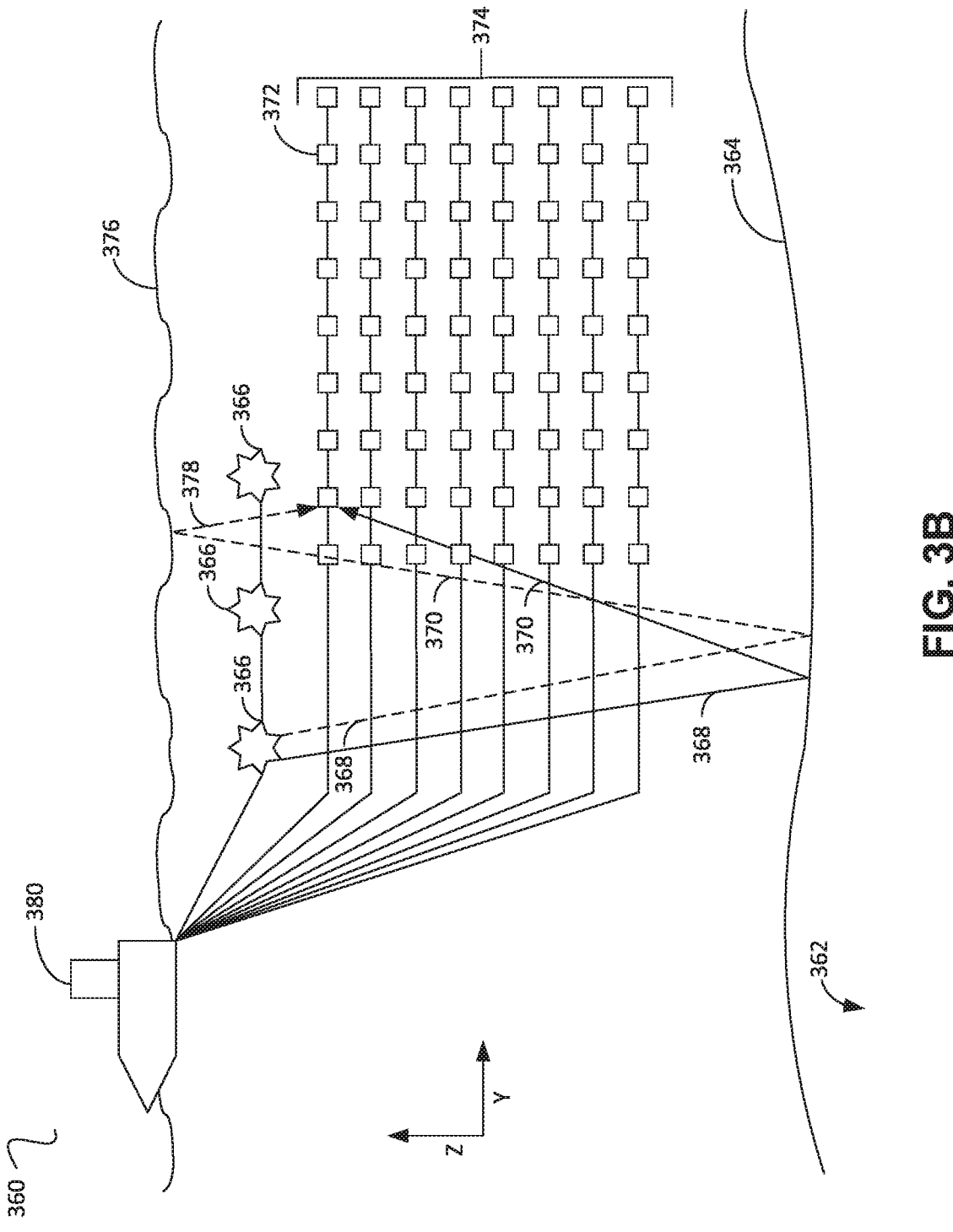

Attention is now directed to FIG. 3B, which illustrates a side view of a marine-based survey 360 of a subterranean subsurface 362 in accordance with one or more implementations of various techniques described herein. Subsurface 362 includes seafloor surface 364. Seismic sources 366 may include marine sources such as vibroseis or airguns, which may propagate seismic waves 368 (e.g., energy signals) into the Earth over an extended period of time or at a nearly instantaneous energy provided by impulsive sources. The seismic waves may be propagated by marine sources as a frequency sweep signal. For example, marine sources of the vibroseis type may initially emit a seismic wave at a low frequency (e.g., 5 Hz) and increase the seismic wave to a high frequency (e.g., 80-90 Hz) over time.

The component(s) of the seismic waves 368 may be reflected and converted by seafloor surface 364 (i.e., reflector), and seismic wave reflections 370 may be received by a plurality of seismic receivers 372. Seismic receivers 372 may be disposed on a plurality of streamers (i.e., streamer array 374). The seismic receivers 372 may generate electrical signals representative of the received seismic wave reflections 370. The electrical signals may be embedded with information regarding the subsurface 362 and captured as a record of seismic data.

In one implementation, each streamer may include streamer steering devices such as a bird, a deflector, a tail buoy and the like, which are not illustrated in this application. The streamer steering devices may be used to control the position of the streamers in accordance with the techniques described herein.

In one implementation, seismic wave reflections 370 may travel upward and reach the water/air interface at the water surface 376, a portion of reflections 370 may then reflect downward again (i.e., sea-surface ghost waves 378) and be received by the plurality of seismic receivers 372. The sea-surface ghost waves 378 may be referred to as surface multiples. The point on the water surface 376 at which the wave is reflected downward is generally referred to as the downward reflection point.

The electrical signals may be transmitted to a vessel 380 via transmission cables, wireless communication or the like. The vessel 380 may then transmit the electrical signals to a data processing center. Alternatively, the vessel 380 may include an onboard computer capable of processing the electrical signals (i.e., seismic data). Those skilled in the art having the benefit of this disclosure will appreciate that this illustration is highly idealized. For instance, surveys may be of formations deep beneath the surface. The formations may typically include multiple reflectors, some of which may include dipping events, and may generate multiple reflections (including wave conversion) for receipt by the seismic receivers 372. In one implementation, the seismic data may be processed to generate a seismic image of the subsurface 362.

Marine seismic acquisition systems tow each streamer in streamer array 374 at the same depth (e.g., 5-10 m). However, marine based survey 360 may tow each streamer in streamer array 374 at different depths such that seismic data may be acquired and processed in a manner that avoids the effects of destructive interference due to sea-surface ghost waves. For instance, marine-based survey 360 of FIG. 3B illustrates eight streamers towed by vessel 380 at eight different depths. The depth of each streamer may be controlled and maintained using the birds disposed on each streamer.

FIG. 4 illustrates a flowchart of a method 400 for interpreting seismic data, according to an embodiment. In particular, the method 400 illustrated may be used for processing 3D seismic data with multiple machine learning techniques. In some embodiments, the method 400 can be implemented with any suitable computing device such as the computing system 901A of FIG. 9, which is described in greater detail below.

At block 402, the method 400 can acquire seismic data. The seismic data may be acquired by generating and recording seismic waves that are propagated through a subterranean domain (e.g., a subterranean volume), or reflected from reflectors (e.g., interfaces between different types of formations). The recording (or traces) can be accomplished using recording devices, such as geophones, hydrophones, or the like, as described above.

In one example, the seismic data may be received from receivers 372 as shown in FIG. 3B. While being towed, the receivers 372 may continuously record the seismic data received from reflections 370. The seismic data received by individual receivers 372 can be characterized according to a function of time and space. The time can represent the time at which the seismic data was received or acquired, and the space can indicate a geographic location or position where the seismic data was received or acquired.

In another example, the seismic data may be received from receivers 118 as shown in FIG. 1A. In this example, sound vibration 112 generated by the source 110 reflects off horizons 114 in earth formation 116. A set of sound vibrations may be received by sensors, such as geophone-receivers 118, situated on the earth's surface. The seismic data received by the receivers 118 may be represented as a function of time and space. The time may represent the time at which the seismic data was received or acquired, and the space may indicate a geographic location or position where the seismic data was received or acquired. In one example, the seismic data can be previously recorded, whether in a marine or land environment, and retrieved from a storage device.

In some embodiments, the seismic data can be aggregated into three-dimensional (3D) seismic volumes that indicate rock formation characteristics of subterranean formations within various geographical areas. For example, the 3D seismic volumes can include seismic data indicating discontinuity patterns, which can be interpreted as horizontal and/or vertical fault lines. In some embodiments, the 3D seismic volumes can be interpreted with any suitable number of machine learning techniques as described in greater detail below in relation to blocks 404-408.

At block 404, the method 400 can further include combining inline probability values and crossline probability values generated by a first machine learning technique to form a merged data set. The inline probability values can indicate a likelihood of a fault residing in a vertical plane of seismic data. The vertical plane is parallel to the direction in which the seismic data was acquired. The crossline probability values can indicate a likelihood of a fault residing in a vertical plane of seismic data. The vertical plane is perpendicular to the direction in which the seismic data was acquired. In some embodiments, the inline probability values are represented as an inline prediction probability cube in which each data point indicates a probability that the data point is associated with a fault line. In some examples, each data point of the inline prediction probability cube can correspond to a different area within a three-dimensional region of a subterranean region. For example, the inline prediction probability cube can include probability values that indicate a likelihood that vertical cross sections of the three-dimensional seismic data include fault lines. The inline prediction probability cube can correspond to fault lines that are parallel to the direction in which the seismic data was acquired.

In some embodiments, the crossline probability values are represented as a crossline prediction probability cube in which each data point indicates a probability that the data point is associated with a fault line. In some embodiments, the crossline prediction probability cube corresponds to fault lines that are perpendicular to the direction in which the seismic data was acquired.

In some examples, the merged data set is calculated by applying any suitable function to the inline probability values and the crossline probability values. For example, the merged data set can be calculated with a maximum function, among others, based on a comparison of corresponding data points of the inline probability values and the crossline probability values. For example, a maximum function can be applied to data points from the inline prediction probability cube and the crossline prediction probability cube that correspond to the same location in a subterranean region. The maximum function can generate a combined or merged probability cube that is discussed in further detail below in relation to FIG. 7.

In some examples, at block 404, the first machine learning technique can be trained to identify one or more vertical fault lines from a 3D seismic volume. For example, labeled vertical planes or slices of three-dimensional seismic data can be provided to the first machine learning technique. The labeled vertical planes can indicate data points corresponding to fault lines and data points that are false positive values, among others. In some embodiments, the first machine learning technique can be a neural network, a classification technique, a regression-based technique, a support-vector machine, and the like. In some examples, the first neural network can include any suitable number of interconnected layers of neurons in various layers. For example, the first neural network can include any number of fully connected layers of neurons that organize the seismic data provided as input. The organized data can enable visualizing a probability of a fault line within a vertical plane of the seismic data as described in greater detail below in relation to FIG. 7.

The first neural network can employ any suitable convolutional neural network techniques, encoding techniques, or clustering techniques such as k-means clustering, hierarchical clustering, and the like. In some embodiments, a convolutional neural network can include any suitable number of local or global pooling layers that can reduce the dimensions of the seismic data by combining output from neuron clusters at one layer into a single neuron in a subsequent layer. In some examples, the convolutional neural network can include computing a maximum value or an average value, among others, while pooling seismic data. For example, a maximum value from a cluster of neurons at a prior layer can be selected and used in a subsequent layer. In some examples, an average value from a cluster of neurons can be selected and used in a subsequent layer.

In some embodiments, each seismic data point can initially be placed in a first cluster, and the first cluster can be merged with additional clusters using a bottom-up approach. In another embodiment, the seismic data points can be included in a first cluster, and the first cluster can be split using recursive techniques as the neurons of the neural network move in a top-down approach. The seismic data points can be combined or split based on a dissimilarity value between the seismic data points. For example, the dissimilarity value can indicate a distance between two seismic data points or two sets of seismic data points. The distance can be calculated using any suitable technique such as a Euclidean distance, a squared Euclidean distance, a Manhattan distance, a Maximum distance, or a Mahalanobis distance, among others. In some embodiments, the first neural network can also include linkage criteria that specifies the dissimilarity of sets of seismic data as a function of pairwise distances of data points in the sets of seismic data. For example, the linkage criteria can be calculated using Maximum or complete-linkage clustering, Minimum or single-linkage clustering, unweighted average linkage clustering, weighted average linkage clustering, centroid linking clustering, or minimum energy clustering, among others.

At block 406, the method 400 can include training a second machine learning technique based on a subset of labeled horizontal planes from the merged data set. In some examples, the second machine learning technique can be trained to identify one or more horizontal fault lines from a 3D seismic volume. The labeled horizontal planes used to train the second machine learning technique can indicate data points that correspond to horizontal fault lines and data points that are false positive values. In some examples, the false positive values do not correspond to a fault line despite a high probability value. In some embodiments, the second machine learning technique can be initiated or trained with a subset of horizontal planes of the combined or merged probability cube, or merged data set.

In some embodiments, the second machine learning technique can be a neural network, a classification technique, a regression-based technique, a support-vector machine, or any other machine learning technique. In some examples, the second machine learning technique can be smaller than the first machine learning technique and include fewer layers of neurons and/or fewer neurons per layer. In some embodiments, the neurons of the second machine learning technique may or may not be fully connected.

In some examples, the trained second machine learning technique can process the remaining horizontal planes of the merged data set. Furthermore, in some examples, the second machine learning technique can be trained with horizontal planes of seismic data from multiple seismic volumes. In some embodiments, an initialized or trained second machine learning technique can analyze the merged data set without detecting labeled horizontal planes of seismic data for the seismic volume being analyzed. For example, the trained second machine learning technique can process a merged data set of a seismic volume based on weights assigned to neurons in previous training iterations of the machine learning technique. In some embodiments, the output of the second machine learning technique can include a modified merged data set or modified probability cube that reflects a probability that each point in a vertical plane or a horizontal plane of seismic data corresponds to a fault line. In some examples, the output of the second machine learning technique can identify and remove false positive data values previously identified as fault lines. An example of output from the second machine learning technique is described below in relation to FIG. 8.

At block 408, the method 400 can include generating a three-dimensional representation of the seismic volume based on the second machine learning technique. In some embodiments, the three-dimensional representation can include an indication of a three-dimensional fault structure within the 3D seismic volume. The three-dimensional fault structure, as discussed herein, can include any suitable number of vertical faults, horizontal faults, or a combination thereof. In some examples, the three-dimensional representation of the seismic volume can remove false positives unrelated to fault lines and connect horizontal and vertical fault lines. In some examples, the three-dimensional representation of the seismic volume can enable the selection of drilling plans for reservoirs corresponding to the seismic data. For example, the three-dimensional representation can indicate regions of a subterranean region to be avoided in conventional drilling due to likely fault lines. In some examples, the three-dimensional representation can indicate regions of a subterranean region to be utilized in unconventional drilling. For example, the identified faults can enable removal of additional oil and/or gas from a reservoir by allowing the oil and/or gas to travel through the faults and to become trapped in a reservoir.

In some embodiments, the three-dimensional representation of the seismic volume can be stored on a local computing device or transmitted to an external computing device for storage. In some examples, an alert can be generated based on the three-dimensional representation of the seismic volume and transmitted to equipment controlling a drill string. For example, the alert can indicate a horizontal and/or vertical change in direction of drilling based on identified horizontal and/or vertical fault lines.

The process flow diagram of FIG. 4 is not intended to indicate that the operations of the method 400 are to be executed in any particular order, or that all of the operations of the method 400 are to be included in every case. Additionally, the method 400 can include any suitable number of additional operations. For example, the method 400 can include creating a three-dimensional subsurface model of subterranean rock associated with an oil and gas reservoir. The method 400 can also include selecting an oil and gas production plan based on the three-dimensional subsurface model. For example, the three-dimensional subsurface model can be used to indicate a location and size of a potential reservoir. Furthermore, the method 400 can include transmitting the oil and gas production plan to equipment to cause a retrieval of a resource from the oil and gas reservoir.

Figure 5:
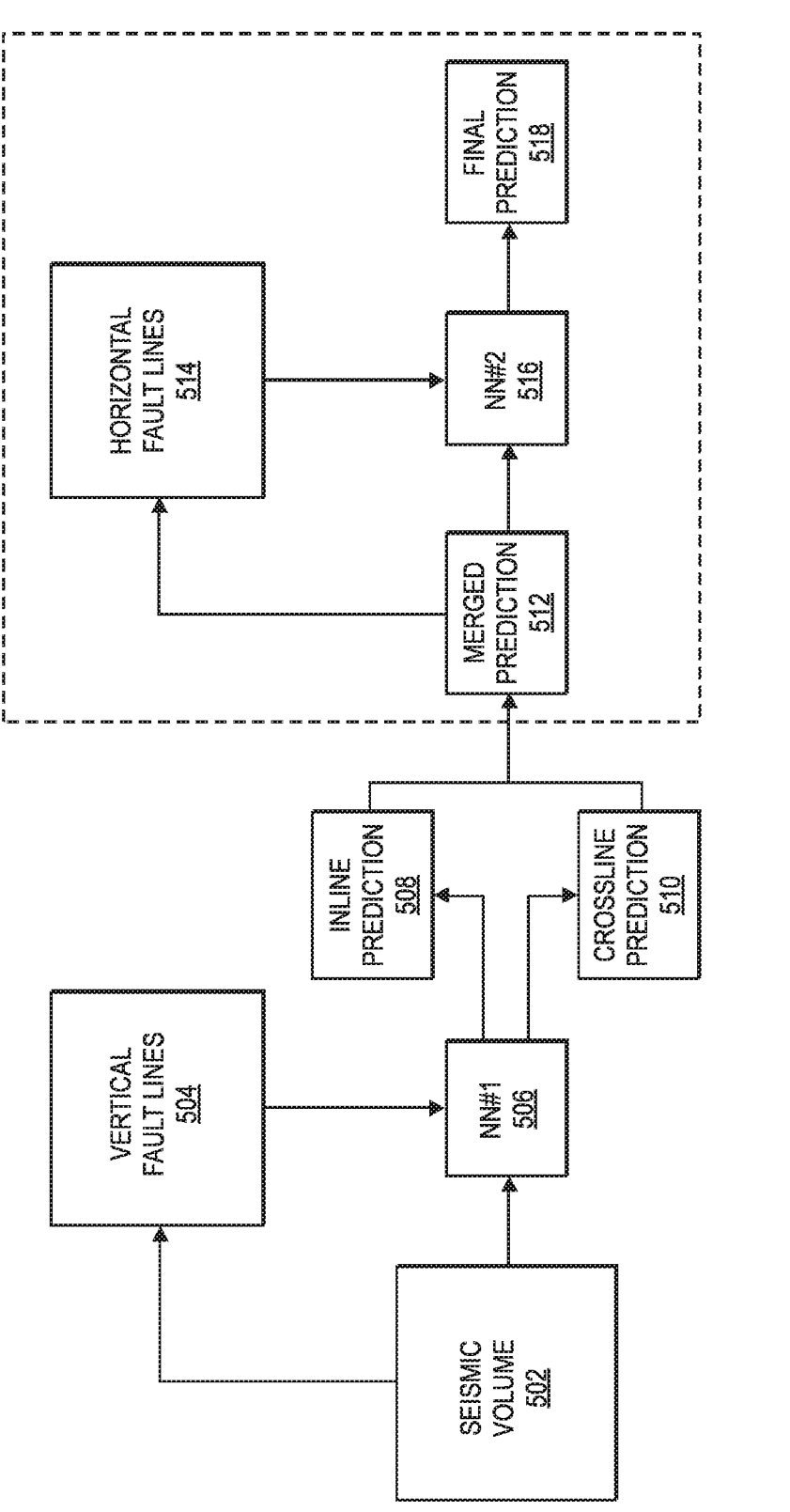
FIG. 5 illustrates a block diagram for interpreting 3D seismic data with machine learning techniques, according to an embodiment.

FIG. 5 illustrates a block diagram for interpreting 3D seismic data with machine learning techniques, according to embodiments herein. In some examples, a seismic volume 502 can include any suitable number of three-dimensional seismic data sets. In some embodiments, the three-dimensional seismic data sets can include any number of data points corresponding to crossline data values and inline data values.

In some embodiments, vertical fault lines 504 can be labeled within the seismic volume 502. For example, any suitable subset of vertical planes of data from the seismic volume 502 can be labeled for vertical fault lines, false positive values, and the like. In some embodiments, the labeled vertical fault lines 504 can be provided to a first neural network (NN #1) 506. As discussed above, the first neural network 506 can analyze the remaining vertical planes of the seismic volume 502 and generate output comprising inline prediction values 508 and crossline prediction values 510. The inline prediction values 508 can include any suitable representation of data points indicating a likelihood or probability of fault lines in the inline vertical planes of the seismic volume 502. The inline vertical planes can include a two dimensional vertical plane of the seismic volume 502, wherein the inline vertical planes are parallel to the direction from which the seismic volume 502 was acquired. The crossline prediction values 510 can include any suitable representation of data points indicating a likelihood or probability of fault lines in the crossline vertical planes of the seismic volume 502. The crossline vertical planes can include a two dimensional vertical plane of the seismic volume 502, wherein the crossline vertical planes are perpendicular to the direction from which the seismic volume 502 was acquired. In some examples, the inline prediction values 508 and the crossline prediction values 510 can be represented as three-dimensional probability cubes in which each data point of the 3D probability cubes corresponds to a probability of a fault line at that data point.

In some embodiments, a merged prediction 512 is generated by combining the inline prediction values 508 and the crossline prediction values 510. The merged prediction 512 can be generated with a maximum function or any other suitable function. For example, the inline prediction values 508 and the crossline prediction values 510 can be merged by creating a merged three-dimensional probability cube in which each data point is a maximum data point based on corresponding data points in the inline prediction 508 and the crossline prediction 510. In some examples, the inline prediction values 508 and the crossline prediction values 510 can be merged with any other suitable function such as a minimum function, an average function, a mean function, and the like.

In some embodiments, a subset of horizontal planes of data 514 from the merged prediction 512 can be extracted, labeled, and used to train a second neural network (NN #2) 516. In some examples, the number of horizontal planes of labeled data 514 used to train the second neural network 516 can be less than the number of vertical planes of labeled data used to train the first neural network 506. For example, the second neural network 516 can be trained with as few as one or two horizontal planes of labeled data 514 from the merged prediction 512. In some embodiments, the second neural network 516 can generate output such as the final prediction 518. In some embodiments, the final prediction 518 indicates horizontal fault lines within the merged prediction 512. In some embodiments, the second neural network 516 can identify and remove false positive data values that do not correspond to fault lines. Accordingly, the final prediction 518 can include fewer false positive data points, which can reduce the noise of the final prediction 518 to more clearly indicate vertical fault lines and/or horizontal fault lines.

In some examples, the final prediction 518 can be any suitable three-dimensional representation of data points indicating the probability of horizontal and/or vertical fault lines. The final prediction 518 can be displayed within a user interface, transmitted to an external device, and/or stored within any suitable computing device. In some embodiments, the final prediction 518 can be used to modify a drilling plan. The final prediction 518 is described below in relation to FIG. 8.

Figures 6A, 6B:
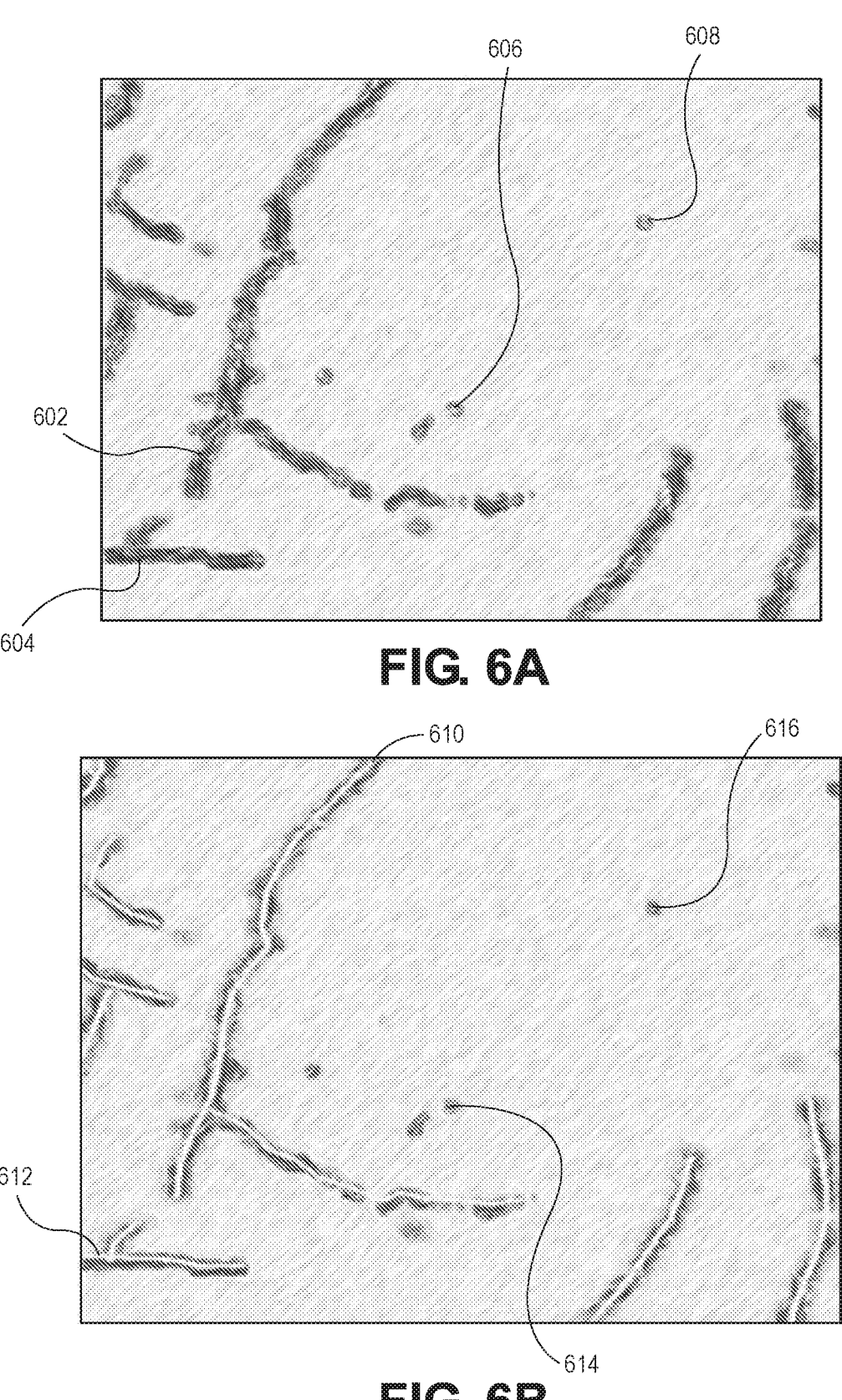
FIG. 6A is an example of a horizontal plane of data from analyzed 3D seismic data, according to an embodiment.
FIG. 6B is an example of an interpretation of fault lines within a horizontal plane of data from analyzed 3D seismic data, according to an embodiment.

FIG. 6A is an example of a horizontal plane of data from analyzed 3D seismic data. In some embodiments, the analyzed 3D seismic data corresponds to a merged probability cube based on an inline prediction probability cube and a crossline prediction probability cube. In some examples, the first machine learning technique can generate the inline prediction probability cube and the crossline prediction probability cube, which can be combined to form the merged probability cube based on any suitable function, such as a maximum function, among others. The horizontal plane of data 600 of FIG. 6A represents data points along an X axis and Y axis. The data points 602 and 604 can represent high probability data values that likely correspond to horizontal fault lines. The horizontal fault lines are represented as a pattern of discontinuity that can exist in a horizontal direction, a vertical direction, or any combination thereof. In some examples, the data points 606 and 608 can represent high probability data values that are likely false positives for horizontal fault lines because the data points 606 and 608 are isolated.

FIG. 6B is an example of an interpretation of fault lines within a horizontal plane of data from analyzed 3D seismic data. In some embodiments, the analyzed 3D seismic data corresponds to a merged probability cube based on an inline prediction probability cube and a crossline prediction probability cube. In some examples, the first machine learning technique can generate the inline prediction probability cube and the crossline prediction probability cube, which can be combined to form the merged probability cube based on any suitable function, such as a maximum function, among others. In some embodiments, the data points 610 and 612 correspond to labeled horizontal fault lines. In some examples, the labeled horizontal fault lines are identified due to interconnectedness with surrounding high probability data points. For example, the data points 610 and 612 belong to a pattern of discontinuity that exists within the 3D seismic data. In some embodiments, a fault line can be predicted if the pattern of discontinuity exists within an area of the 3D seismic data that exceeds a predetermined threshold. In some embodiments, the data points 614 and 616 are considered to be false positive values that are not interconnected with neighboring high probability data points. Accordingly, in some examples, data points 614 and 616 are not identified as horizontal fault lines and can be discarded or ignored. In some embodiments, the probability values for data points 614 and 616 can be adjusted to a lower probability value of neighboring data points.

Figure 7:
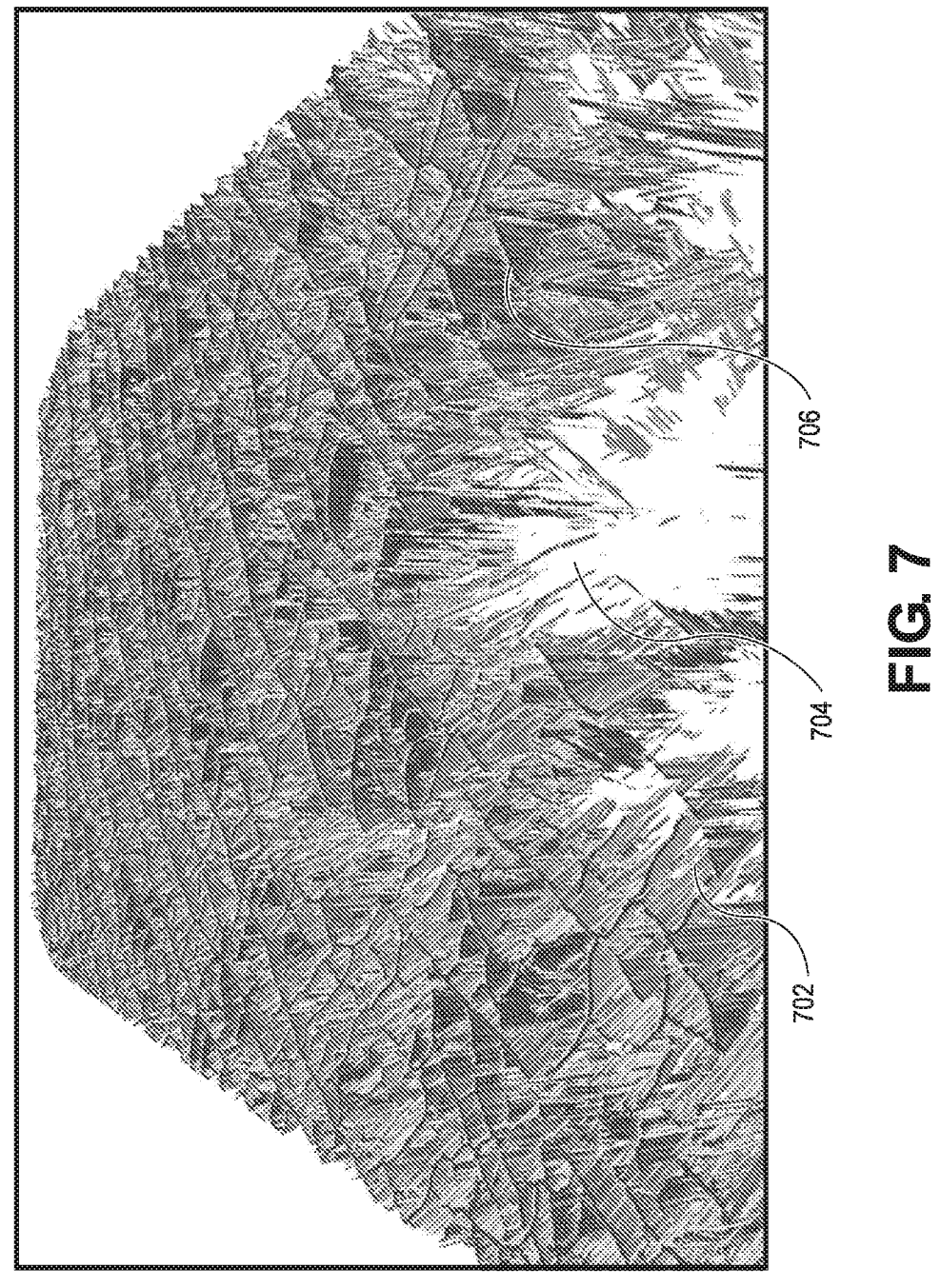
FIG. 7 is an example diagram depicting output from a first machine learning technique, according to an embodiment.

FIG. 7 is an example diagram depicting output from a first machine learning technique. In some embodiments, the output 700 represents a merged representation of a 3D inline prediction probability cube and a 3D crossline prediction probability cube. As discussed above, the output 700 from a first neural network can indicate a probability of vertical fault lines in a seismic volume. However, regions 702, 704, and 706, among others, can be noisy and include a higher percentage of false positive values. In some examples, regions 702, 704, and 706 can also lack continuity and consistency. In some embodiments, the output 700 can be difficult to interpret due to the representation of a higher concentration of false positive data values and a lack of continuity.

Figure 8:
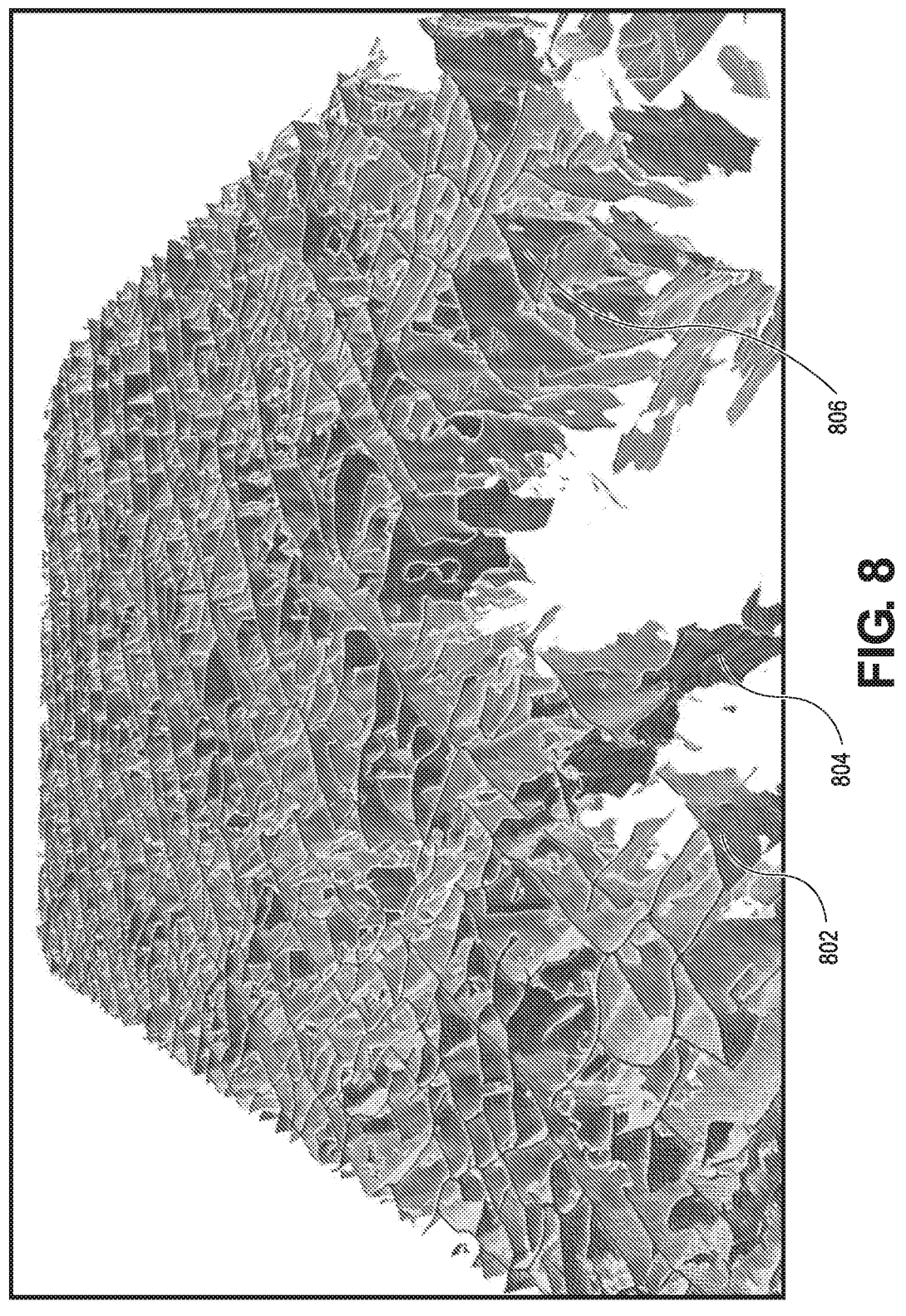
FIG. 8 is an example diagram depicting output from a second machine learning technique, according to an embodiment.

FIG. 8 is an example diagram depicting output from a second machine learning technique. In some embodiments, the output 800 represents the probability of vertical fault lines and horizontal fault lines in a seismic volume. The second neural network can remove false positive data points from horizontal planes, which can remove noise from the output 800. The second neural network can also improve the continuity and consistency of data values corresponding to fault lines. In some embodiments, regions 802, 804, and 806 can include clear indications of fault structures within a seismic volume. In some embodiments, the output 800 can enable the detection of three-dimensional fault structures in a seismic volume by generating points within the regions 802, 804, and 806 that indicate a high likelihood of a horizontal or vertical fault line at a particular location in a subterranean region.

In one or more embodiments, the functions described can be implemented in hardware, software, firmware, or any combination thereof. For a software implementation, the techniques described herein can be implemented with modules (e.g., procedures, functions, subprograms, programs, routines, subroutines, modules, software packages, classes, and so on) that perform the functions described herein. A module can be coupled to another module or a hardware circuit by passing and/or receiving information, data, arguments, parameters, or memory contents. Information, arguments, parameters, data, or the like can be passed, forwarded, or transmitted using any suitable means including memory sharing, message passing, token passing, network transmission, and the like. The software codes can be stored in memory units and executed by processors. The memory unit can be implemented within the processor or external to the processor, in which case it can be communicatively coupled to the processor via various means as is known in the art.

Figure 9:
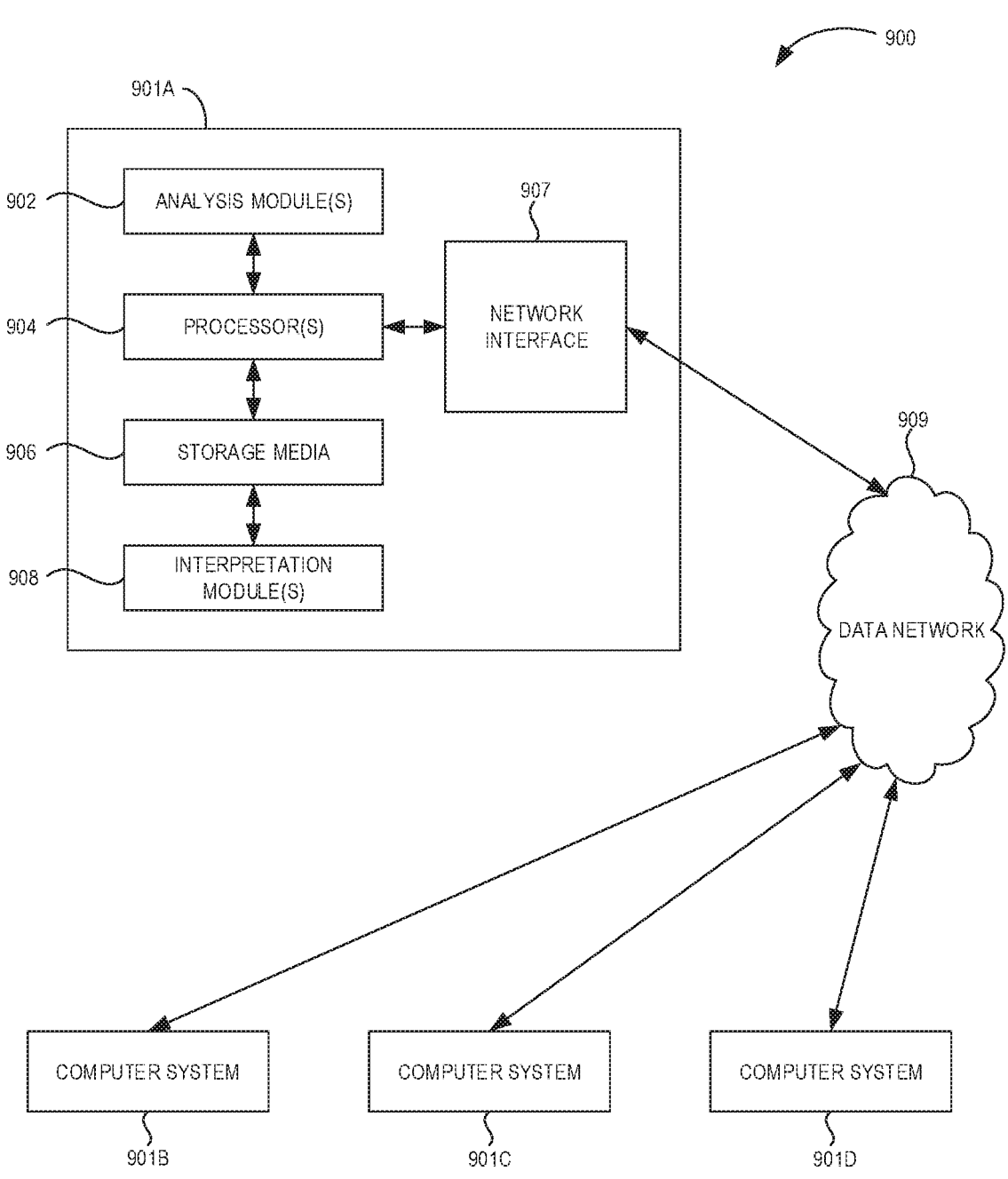
FIG. 9 illustrates a schematic view of a computing system, according to an embodiment.

In some embodiments, any of the methods of the present disclosure may be executed by a computing system. FIG. 9 illustrates an example of such a computing system 900, in accordance with some embodiments. The computing system 900 may include a computer or computer system 901A, which may be an individual computer system 901A or an arrangement of distributed computer systems. The computer system 901A includes one or more analysis module(s) 902 configured to perform various tasks according to some embodiments, such as one or more methods disclosed herein. To perform these various tasks, the analysis module 902 executes independently, or in coordination with, one or more processors 904, which is (or are) connected to one or more storage media 906. The processor(s) 904 is (or are) also connected to a network interface 907 to allow the computer system 901A to communicate over a data network 909 with one or more additional computer systems and/or computing systems, such as 901B, 901C, and/or 901D (note that computer systems 901B, 901C and/or 901D may or may not share the same architecture as computer system 901A, and may be located in different physical locations, e.g., computer systems 901A and 901B may be located in a processing facility, while in communication with one or more computer systems such as 901C and/or 901D that are located in one or more data centers, and/or located in varying countries on different continents).

A processor can include a microprocessor, microcontroller, processor module or subsystem, programmable integrated circuit, programmable gate array, or another control or computing device.

The storage media 906 can be implemented as one or more non-transitory computer-readable or non-transitory machine-readable storage media. Note that while in the example embodiment of FIG. 9 storage media 906 is depicted as within computer system 901A, in some embodiments, storage media 906 may be distributed within and/or across multiple internal and/or external enclosures of computing system 901A and/or additional computing systems. Storage media 906 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY® disks, or other types of optical storage, or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In some embodiments, computing system 900 contains one or more interpretation module(s) 908. In the example of computing system 900, computer system 901A includes the interpretation module 908. In some embodiments, a single interpretation module 908 may be used to perform some or all aspects of one or more embodiments of the methods. In alternate embodiments, a plurality of interpretation modules 908 may be used to perform some or all aspects of techniques described herein.

It should be appreciated that computing system 900 is only one example of a computing system, and that computing system 900 may have more or fewer components than shown, may combine additional components not depicted in the example embodiment of FIG. 9, and/or computing system 900 may have a different configuration or arrangement of the components depicted in FIG. 9. The various components shown in FIG. 9 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of protection of the invention.

Geologic interpretations, models and/or other interpretation aids may be refined in an iterative fashion; this concept is applicable to embodiments of the present methods discussed herein. This can include use of feedback loops executed on an algorithmic basis, such as at a computing device (e.g., computing system 900, FIG. 9), and/or through manual control by a user who may make determinations regarding whether a given step, action, template, model, or set of curves has become sufficiently accurate for the evaluation of the subsurface three-dimensional geologic formation under consideration.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. Moreover, the order in which the elements of the methods are illustrated and described may be re-arranged, and/or two or more elements may occur simultaneously. The embodiments were chosen and described in order to best explain the principals of the invention and its practical applications, to thereby enable others skilled in the art to best utilize the invention and various embodiments with various modifications as are suited to the particular use contemplated.

What is claimed is:

1. A method for interpreting seismic data, the method comprising:

receiving seismic data that represents a current condition of a subterranean volume in an oil and gas reservoir, the seismic data being received from at least one sensor disposed in the subterranean volume in the oil and gas reservoir;

training a first machine learning technique to:

receive one or more vertical fault lines in a seismic volume based on the seismic data; and generate one or more inline probability values and one or more crossline probability values based on the received one or more vertical fault lines;

generating a merged data set by combining the one or more inline probability values and the one or more crossline probability values;

training a second machine learning technique based on a subset of labeled horizontal planes from the merged data set, the second machine learning technique being trained to:

receive one or more horizontal fault lines from the seismic volume from the merged data set;

remove false positive data points from the subset of labeled horizontal planes to improve continuity and consistency of the one or more inline probability values and the one or more crossline probability values generated by the first machine learning technique; and identify high probability data values that are likely false positives for the identified one or more horizontal fault lines;

generating a representation of the seismic volume, the representation comprising a display of a plurality of three-dimensional continuous fault structures within the seismic volume including at least one of predicted horizontal fault lines or predicted vertical fault lines at locations where the seismic data does not include a fault line being represented by a coherent planar surface, the representation of the seismic volume identifying one or more of:

at least one region of the reservoir to be avoided in conventional drilling due to a presence of the at least one of predicted horizontal fault lines or predicted vertical fault lines; or at least one region of the reservoir to be utilized in unconventional drilling comprising the at least one of predicted horizontal fault lines or predicted vertical fault lines enabling removal of at least one of oil or gas from the reservoir by allowing the at least one of oil or gas to travel through the at least one of predicted horizontal fault lines or predicted vertical fault lines and to become trapped in the reservoir; and creating a three-dimensional subsurface model of the subterranean volume, the three-dimensional subsurface model comprising the representation of the seismic volume comprising the displayed plurality of three-dimensional fault structures including the at least one of the predicted horizontal fault lines or the predicted vertical fault lines, the generated one or more inline probability values and one or more crossline probability values indicating a likelihood of a presence of the at least one of the predicted horizontal fault lines or the predicted vertical fault lines at locations where the seismic data does not include a fault line;

selecting an oil and gas production plan based on the three-dimensional subsurface model, the oil and gas production plan comprising functional parameters for operation of a production tool, a weight on a bit, a pump rate, or a physical parameter of the production tool, the selected oil and gas production plan comprising one or more of:

avoiding the at least one region of the reservoir to be avoided due to the presence of the at least one of predicted horizontal fault lines or predicted vertical fault lines; or utilizing the at least one region of the reservoir to be utilized comprising the at least one of predicted horizontal fault lines or predicted vertical fault lines enabling removal of at least one of oil or gas from the reservoir by allowing the at least one of oil or gas to travel through the at least one of predicted horizontal fault lines or predicted vertical fault lines and to become trapped in the reservoir;

transmitting the selected oil and gas production plan to equipment to adjust a retrieval of a resource from the oil and gas reservoir, the adjusting the retrieval comprising controlling at least one of: the operation of a production tool, the weight on the bit, the pump rate, or the physical parameter of the production tool to optimize drilling in accordance with the selected oil and gas production plan; and retrieving the resource from the oil and gas reservoir, the retrieving comprising automatically controlling the at least one of: the operation of the production tool, the weight on the bit, the pump rate, or the physical parameter of the production tool to optimize the drilling in accordance with the selected oil and gas production plan and based on the current condition of the subterranean volume.

2. The method of claim 1, wherein the representation is a three-dimensional digital representation that is visualized on display.

3. The method of claim 1, wherein the generating the merged data set comprises applying a maximum value function to the one or more inline probability values and the one or more crossline probability values.

4. The method of claim 1, further comprising:

generating an inline prediction probability cube based on the one or more inline probability values; and generating a crossline prediction probability cube based on the one or more crossline prediction values, the crossline prediction probability cube and the inline prediction probability cube being generated based on the seismic volume provided to the first machine learning technique.

5. The method of claim 1, wherein the first machine learning technique is a first neural network and the second machine learning technique is a second neural network.

6. The method of claim 5, wherein the second neural network is further trained with a second subset of labeled horizontal planes from a previously analyzed seismic volume, the previously analyzed seismic volume comprising a merged probability cube generated by the first neural network.

7. The method of claim 6, wherein the second neural network is configured to identify a horizontal fault line in a subsequent seismic volume without a subset of labeled horizontal planes from the subsequent seismic volume.

8. The method of claim 1, wherein the second machine learning technique is smaller than the first machine learning technique and includes at least one of fewer layers of neurons or fewer neurons per layer than the first machine learning technique.

9. The method of claim 8, wherein the neurons of the second machine learning technique are not fully connected.

10. A computing system for interpreting seismic data, comprising:
 one or more processors; and
 a memory system comprising one or more non-transitory computer-readable media storing instructions that, when executed by at least one of the one or more processors, cause the computing system to perform operations, the operations comprising:
  receiving seismic data that represents a current condition of a subterranean volume in an oil and gas reservoir, the seismic data being received from at least one sensor disposed in the subterranean volume in the oil and gas reservoir;
 training a first machine learning technique to:
  receive one or more vertical fault lines in a seismic volume based on the seismic data; and
  generate one or more inline probability values and one or more crossline probability values;
 generating a merged data set by combining the one or more inline probability values and the one or more crossline probability values;
 training a second machine learning technique based on a subset of labeled horizontal planes from the merged data set, the second machine learning technique being trained to:
  receive one or more horizontal fault lines from the seismic volume from the merged data set;
  remove false positive data points from the subset of labeled horizontal planes to improve continuity and consistency of the one or more inline probability values and the one or more crossline probability values generated by the first machine learning technique; and
  identify high probability data values that are likely false positives for the identified one or more horizontal fault lines;
 generating a representation of the seismic volume, the representation comprising a display of a plurality of three-dimensional continuous fault structures within the seismic volume including at least one of predicted horizontal fault lines or predicted vertical fault lines at locations where the seismic data does not include a fault line being represented by a coherent planar surface, the representation of the seismic volume identifying one or more of:
  at least one region of the reservoir to be avoided in conventional drilling due to a presence of the at least one of predicted horizontal fault lines or predicted vertical fault lines; or
  at least one region of the reservoir to be utilized in unconventional drilling comprising the at least one of predicted horizontal fault lines or predicted vertical fault lines enabling removal of at least one of oil or gas from the reservoir by allowing the at least one of oil or gas to travel through the at least one of predicted horizontal fault lines or predicted vertical fault lines and to become trapped in the reservoir; and
 creating a three-dimensional subsurface model of the subterranean volume, the three-dimensional subsurface model comprising the representation of the seismic volume comprising the displayed plurality of three-dimensional fault structures including the at least one of the predicted horizontal fault lines or the predicted vertical fault lines, the generated one or more inline probability values and one or more crossline probability values indicating a likelihood of a presence of the at least one of the predicted horizontal fault lines or the predicted vertical fault lines at locations where the seismic data does not include a fault line;
 selecting an oil and gas production plan based on the three-dimensional subsurface model, the oil and gas production plan comprising functional parameters for operation of a production tool, a weight on a bit, a pump rate, or a physical parameter of the production tool, the selected oil and gas production plan comprising one or more of:
  avoiding the at least one region of the reservoir to be avoided due to the presence of the at least one of predicted horizontal fault lines or predicted vertical fault lines; or
  utilizing the at least one region of the reservoir to be utilized comprising the at least one of predicted horizontal fault lines or predicted vertical fault lines enabling removal of at least one of oil or gas from the reservoir by allowing the at least one of oil or gas to travel through the at least one of predicted horizontal fault lines or predicted vertical fault lines and to become trapped in the reservoir;
 transmitting the selected oil and gas production plan to equipment to adjust a retrieval of a resource from the oil and gas reservoir, the adjusting the retrieval comprising controlling at least one of: the operation of a production tool, the weight on the bit, the pump rate, or the physical parameter of the production tool to optimize drilling in accordance with the selected oil and gas production plan; and
 retrieving the resource from the oil and gas reservoir, the retrieving comprising automatically controlling the at least one of: the operation of the production tool, the weight on the bit, the pump rate, or the physical parameter of the production tool to optimize the drilling in accordance with the selected oil and gas production plan and based on the current condition of the subterranean volume.

11. The computing system of claim 10, wherein the generating the merged data set comprises applying a maximum value function to the one or more inline probability values and the one or more crossline probability values.

12. The computing system of claim 10, wherein the seismic volume comprises a set of data representing one or more subterranean rock formation characteristics.

13. The computing system of claim 10, wherein:

the operations further comprise:

generating an inline prediction probability cube based on the one or more inline probability values; and generating a crossline prediction probability cube based on the one or more crossline prediction values; and the crossline prediction probability cube and the inline prediction probability cube are generated based on the seismic volume provided to the first machine learning technique.

14. The computing system of claim 10, wherein the first machine learning technique is a first neural network and the second machine learning technique is a second neural network.

15. The computing system of claim 14, wherein the second neural network is further trained with a second subset of labeled horizontal planes from a previously analyzed seismic volume, the previously analyzed seismic volume comprising a merged probability cube generated by the first neural network.

16. The computing system of claim 15, wherein the second neural network is configured to identify a horizontal fault line in a subsequent seismic volume without a subset of labeled horizontal planes from the subsequent seismic volume.

17. At least one non-transitory computer-readable medium for interpreting seismic data, the at least one computer-readable medium comprising a plurality of computer-executable instructions that, in response to execution by a processor, cause the processor to:

receive seismic data that represents a current condition of a subterranean volume in an oil and gas reservoir, the seismic data being received from at least one sensor disposed in the subterranean volume in the oil and gas reservoir;

train a first machine learning technique to:

receive one or more vertical fault lines in a seismic volume based on the seismic data; and generate one or more inline probability values and one or more crossline probability values based on the received one or more vertical fault lines;

generate a merged data set by combining the one or more inline probability values and the one or more crossline probability values;

train a second machine learning technique based on a subset of labeled horizontal planes from the merged data set, the second machine learning technique being trained to:

receive one or more horizontal fault lines from the seismic volume from the merged data set;

remove false positive data points from the subset of labeled horizontal planes to improve continuity and consistency of the one or more inline probability values and the one or more crossline probability values generated by the first machine learning technique; and identify high probability data values that are likely false positives for the identified one or more horizontal fault lines;

generate a representation of the seismic volume, the representation comprising a display of a plurality of three-dimensional continuous fault structures within the seismic volume including at least one of predicted horizontal fault lines or predicted vertical fault lines at locations where the seismic data does not include a fault line being represented by a coherent planar surface, the representation of the seismic volume identifying one or more of:

at least one region of the reservoir to be avoided in conventional drilling due to a presence of the at least one of predicted horizontal fault lines or predicted vertical fault lines; or at least one region of the reservoir to be utilized in unconventional drilling comprising the at least one of predicted horizontal fault lines or predicted vertical fault lines enabling removal of at least one of oil or gas from the reservoir by allowing the at least one of oil or gas to travel through the at least one of predicted horizontal fault lines or predicted vertical fault lines and to become trapped in the reservoir; and create a three-dimensional subsurface model of the subterranean volume, the three-dimensional subsurface model comprising the representation of the seismic volume comprising the displayed plurality of three-dimensional fault structures including the at least one of the predicted horizontal fault lines or the predicted vertical fault lines, the generated one or more inline probability values and one or more crossline probability values indicating a likelihood of a presence of the at least one of the predicted horizontal fault lines or the predicted vertical fault lines at locations where the seismic data does not include a fault line;

select an oil and gas production plan based on the three-dimensional subsurface model, the oil and gas production plan comprising functional parameters for operation of a production tool, a weight on a bit, a pump rate, or a physical parameter of the production tool, the selected oil and gas production plan comprising one or more of:

avoiding the at least one region of the reservoir to be avoided due to the presence of the at least one of predicted horizontal fault lines or predicted vertical fault lines; or utilizing the at least one region of the reservoir to be utilized comprising the at least one of predicted horizontal fault lines or predicted vertical fault lines enabling removal of at least one of oil or gas from the reservoir by allowing the at least one of oil or gas to travel through the at least one of predicted horizontal fault lines or predicted vertical fault lines and to become trapped in the reservoir;

transmit the selected oil and gas production plan to equipment to adjust a retrieval of a resource from the oil and gas reservoir, the adjusting the retrieval comprising controlling at least one of: the operation of a production tool, the weight on the bit, the pump rate, or the physical parameter of the production tool to optimize drilling in accordance with the selected oil and gas production plan; and retrieve the resource from the oil and gas reservoir, the retrieving comprising automatically controlling the at least one of: the operation of the production tool, the weight on the bit, the pump rate, or the physical parameter of the production tool to optimize the drilling in accordance with the selected oil and gas production plan and based on the current condition of the subterranean volume.

* * * * *